US009313637B2

(12) United States Patent
Mitchell, Jr. et al.

(10) Patent No.: US 9,313,637 B2
(45) Date of Patent: Apr. 12, 2016

(54) WIRELESS EMERGENCY CALLER PROFILE DATA DELIVERY OVER A LEGACY INTERFACE (71) Applicants: Donald L. Mitchell, Jr., Bellevue, WA (US); Roger S. Marshall, Auburn, WA (US); Andrew Singer, Seattle, WA (US); Firdaus Aryana, Seattle, WA (US)

(72) Inventors: Donald L. Mitchell, Jr., Bellevue, WA (US); Roger S. Marshall, Auburn, WA (US); Andrew Singer, Seattle, WA (US); Firdaus Aryana, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 43 days.

(21) Appl. No.: 13/690,621

(22) Filed: Nov. 30, 2012

(65) Prior Publication Data
US 2013/0143517 A1 Jun. 6, 2013

Related U.S. Application Data (60) Provisional application No. 61/566,918, filed on Dec. 5, 2011.

(51) Int. Cl.
H04W 4/22 (2009.01)
(52) U.S. Cl.
CPC ........................................ H04W 4/22 (2013.01)
(58) Field of Classification Search
CPC ............ H04W 4/22; H04W 4/02; H04W 4/04
USPC ............. 455/404.1, 404.2, 445, 456.1, 456.2, 455/456.3, 456.4, 456.5, 456.6, 457
See application file for complete search history.

(56) References Cited

U.S. PATENT DOCUMENTS 1,103,073 A 7/1914 O'Connell
4,445,118 A 4/1984 Taylor
(Continued)

FOREIGN PATENT DOCUMENTS

GB  PCT/GB00/04499   11/2000
WO  PCT/SE98/01887   10/1998
(Continued)

OTHER PUBLICATIONS

International Search Report received in PCT/US2012/067857 dated Feb. 20, 2013.
(Continued)

Primary Examiner — Sharad Rampuria
Assistant Examiner — Farideh Madani
(74) Attorney, Agent, or Firm — William H. Bollman (57) ABSTRACT Dynamically selecting and facilitating stored caller information to a communications recipient device with a communications event, based on communication recipient credentials (e.g. MDN, etc.), preferences outlined in a subscriber profile associated with a relevant calling device, and other variables, e.g., time of day, etc. A subscriber provisions subscriber preferences and subscriber information associated with users of a subscribing communications device in to a subscriber profile, for use during a communications event. Subscriber preferences place restrictive conditions on stored subscriber information that may be transmitted with a communications event initiated by a corresponding communications device. A content collection node dynamically selects customized caller information via a subscriber information content collection process. Customized caller information is transmitted to appropriate recipient devices with a corresponding communications event. In the event of a 911 communications event, customized caller information may be transmitted to emergency dispatch personnel via the legacy E2 query interface.

16 Claims, 5 Drawing Sheets (56) References Cited

U.S. PATENT DOCUMENTS

| | | |
|---|---|---|
| 4,494,119 A | 1/1985 | Wimbush |
| 4,625,081 A | 11/1986 | Lotio |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimullah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Åström |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,611,050 A | 3/1997 | Theimer |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorme et al. |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khuc |
| 5,841,396 A | 11/1998 | Krasner |
| 5,857,201 A | 1/1999 | Wright, Jr. |
| 5,864,667 A | 1/1999 | Barkan |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |
| 5,930,250 A | 7/1999 | Klok |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |

(56) References Cited

U.S. PATENT DOCUMENTS

| | | |
|---|---|---|
| 6,058,300 A | 5/2000 | Hanson |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabash |
| 6,108,533 A | 8/2000 | Brohoff |
| 6,121,923 A | 9/2000 | King |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi et al. |
| 6,134,483 A | 10/2000 | Vayanos |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,188,354 B1 | 2/2001 | Soliman |
| 6,188,752 B1 | 2/2001 | Lesley |
| 6,188,909 B1 | 2/2001 | Alanara |
| 6,189,098 B1 | 2/2001 | Kaliski, Jr. |
| 6,195,555 B1 | 2/2001 | Dent |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotola |
| 6,324,524 B1 | 11/2001 | Lent et al. |
| 6,327,473 B1 | 12/2001 | Soliman |
| 6,327,479 B1 | 12/2001 | Mikkola |
| 6,333,919 B2 | 12/2001 | Gaffney |
| 6,360,093 B1 | 3/2002 | Ross |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,397,074 B1 | 5/2002 | Pihl |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV et al. |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam et al. |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,675,017 B1 | 1/2004 | Zellner et al. |
| 6,677,894 B2 | 1/2004 | Sheynblat |
| 6,680,694 B1 | 1/2004 | Knockeart |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |

(56) References Cited

U.S. PATENT DOCUMENTS

| | | |
|---|---|---|
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,396 B2 | 4/2004 | Chin |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,264 B2 | 11/2004 | Vassilovski |
| 6,813,499 B2 | 11/2004 | McDonnell |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | van Diggelen |
| 6,937,872 B2 | 8/2005 | Krasner |
| 6,940,826 B1 | 9/2005 | Simard |
| 6,940,950 B2 | 9/2005 | Dickinson |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,113,128 B1 | 9/2006 | Pitt |
| 7,136,466 B1 | 11/2006 | Gao |
| 7,136,838 B1 | 11/2006 | Peinado |
| 7,145,900 B2 | 12/2006 | Nix et al. |
| 7,151,946 B2 | 12/2006 | Maggenti |
| 7,171,220 B2 | 1/2007 | Belcea |
| 7,174,153 B2 | 2/2007 | Ehlers |
| 7,177,397 B2 | 2/2007 | McCalmont |
| 7,177,398 B2 | 2/2007 | Meer |
| 7,177,399 B2 * | 2/2007 | Dawson ............ H04M 3/42229 370/352 |
| 7,194,249 B2 | 3/2007 | Phillips |
| 7,200,380 B2 | 4/2007 | Havlark |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,246,187 B1 | 7/2007 | Ezra |
| 7,260,186 B2 | 8/2007 | Zhu |
| 7,260,384 B2 | 8/2007 | Bales |
| 7,302,582 B2 | 11/2007 | Snapp et al. |
| 7,321,773 B2 | 1/2008 | Hines |
| 7,330,899 B2 | 2/2008 | Wong |
| 7,333,480 B1 | 2/2008 | Clarke |
| 7,366,157 B1 | 4/2008 | Valentine et al. |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scriffignano et al. |
| 7,394,896 B2 | 7/2008 | Norton |
| 7,412,049 B1 | 8/2008 | Koch |
| 7,424,293 B2 | 9/2008 | Zhu |
| 7,426,380 B2 | 9/2008 | Hines |
| 7,428,571 B2 | 9/2008 | Ichimura |

(56) References Cited

U.S. PATENT DOCUMENTS

| | | |
|---|---|---|
| 7,436,785 B1 | 10/2008 | McMullen et al. |
| 7,440,442 B2 | 10/2008 | Grabelsky |
| 7,450,951 B2 | 11/2008 | Vimpari |
| 7,453,990 B2 | 11/2008 | Welenson et al. |
| 7,495,608 B1 | 2/2009 | Chen |
| 7,519,353 B2 | 4/2009 | Stevens |
| 7,573,982 B2 | 8/2009 | Breen |
| 7,602,886 B1 | 10/2009 | Beech |
| 7,617,287 B2 | 11/2009 | Vella |
| 7,623,447 B1 | 11/2009 | Faccin |
| 7,702,081 B1 | 4/2010 | Klesper |
| 7,747,258 B2 | 6/2010 | Farmer |
| 7,764,961 B2 | 7/2010 | Zhu |
| 7,783,297 B2 | 8/2010 | Ishii |
| 7,787,611 B1 | 8/2010 | Kotelly |
| 7,822,391 B1 | 10/2010 | Delker |
| 7,881,233 B2 | 2/2011 | Bieselin |
| 7,937,067 B2 | 5/2011 | Maier |
| 8,291,011 B2 * | 10/2012 | Abu-Hakima et al. ....... 709/203 |
| 2001/0011247 A1 | 8/2001 | O'Flaherty |
| 2001/0040886 A1 | 11/2001 | Jimenez |
| 2002/0002036 A1 | 1/2002 | Uehara |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086676 A1 | 7/2002 | Hendrey |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan et al. |
| 2002/0118796 A1 | 8/2002 | Menard |
| 2002/0123327 A1 | 9/2002 | Vataja |
| 2002/0126656 A1 | 9/2002 | Park |
| 2002/0158777 A1 | 10/2002 | Flick |
| 2002/0173317 A1 | 11/2002 | Nykanen |
| 2002/0174073 A1 | 11/2002 | Nordman |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0063730 A1 | 4/2003 | Woodring |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086539 A1 | 5/2003 | McCalmont |
| 2003/0096623 A1 | 5/2003 | Kim |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0137961 A1 | 7/2003 | Tsirtsis |
| 2003/0148757 A1 | 8/2003 | Meer |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0163483 A1 | 8/2003 | Zingher |
| 2003/0186709 A1 | 10/2003 | Rhodes |
| 2003/0187803 A1 | 10/2003 | Pitt |
| 2003/0196105 A1 | 10/2003 | Fineberg |
| 2003/0204640 A1 | 10/2003 | Sahineja |
| 2003/0223381 A1 | 12/2003 | Schroderus |
| 2004/0002326 A1 | 1/2004 | Maher |
| 2004/0004761 A1 | 1/2004 | Travis |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068724 A1 | 4/2004 | Gardner |
| 2004/0070515 A1 | 4/2004 | Burkley |
| 2004/0098497 A1 | 5/2004 | Banet |
| 2004/0132465 A1 | 7/2004 | Mattila |
| 2004/0176123 A1 | 9/2004 | Chin |
| 2004/0181689 A1 | 9/2004 | Kiyoto |
| 2004/0184584 A1 | 9/2004 | McCalmont |
| 2004/0190497 A1 | 9/2004 | Knox |
| 2004/0192271 A1 | 9/2004 | Eisner |
| 2004/0198332 A1 | 10/2004 | Lundsgaard |
| 2004/0198386 A1 | 10/2004 | Dupray |
| 2004/0203575 A1 | 10/2004 | Chin |
| 2004/0203876 A1 | 10/2004 | Drawert |
| 2004/0205151 A1 | 10/2004 | Sprigg |
| 2004/0229632 A1 | 11/2004 | Flynn |
| 2004/0242238 A1 | 12/2004 | Wang |
| 2004/0247090 A1 | 12/2004 | Nurmela |
| 2004/0258021 A1 | 12/2004 | Kashimoto |
| 2004/0267445 A1 | 12/2004 | De Luca |
| 2005/0003797 A1 | 1/2005 | Baldwin |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0048987 A1 | 3/2005 | Glass |
| 2005/0063519 A1 | 3/2005 | James |
| 2005/0071671 A1 | 3/2005 | Karaoguz |
| 2005/0083911 A1 | 4/2005 | Grabelsky |
| 2005/0085257 A1 | 4/2005 | Laird |
| 2005/0086467 A1 | 4/2005 | Asokan |
| 2005/0090236 A1 | 4/2005 | Schwinke |
| 2005/0100150 A1 * | 5/2005 | Dhara ................ H04L 29/06 379/142.01 |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood |
| 2005/0136885 A1 | 6/2005 | Kaltsukis |
| 2005/0148346 A1 | 7/2005 | Maloney |
| 2005/0149430 A1 | 7/2005 | Williams |
| 2005/0174991 A1 | 8/2005 | Keagy |
| 2005/0190892 A1 | 9/2005 | Dawson |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0255857 A1 | 11/2005 | Kim |
| 2005/0259675 A1 | 11/2005 | Tuohino |
| 2005/0261002 A1 | 11/2005 | Cheng |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0289097 A1 | 12/2005 | Trossen |
| 2006/0008065 A1 | 1/2006 | Longman |
| 2006/0023747 A1 | 2/2006 | Koren |
| 2006/0026288 A1 | 2/2006 | Acharya |
| 2006/0053225 A1 | 3/2006 | Poikselka |
| 2006/0058049 A1 | 3/2006 | McLaughlin |
| 2006/0058102 A1 | 3/2006 | Nguyen |
| 2006/0068753 A1 | 3/2006 | Karpen |
| 2006/0069503 A1 | 3/2006 | Suomela |
| 2006/0072729 A1 | 4/2006 | Lee |
| 2006/0078094 A1 | 4/2006 | Breen |
| 2006/0104306 A1 | 5/2006 | Adamczyk |
| 2006/0120517 A1 | 6/2006 | Moon |
| 2006/0128395 A1 | 6/2006 | Muhonen |
| 2006/0135132 A1 | 6/2006 | Cai |

(56) References Cited

U.S. PATENT DOCUMENTS

| | | |
|---|---|---|
| 2006/0135177 A1 | 6/2006 | Winterbottom |
| 2006/0171418 A1 | 8/2006 | Herrero |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0233338 A1 | 10/2006 | Venkata |
| 2006/0234639 A1 | 10/2006 | Kushwaha |
| 2006/0234698 A1 | 10/2006 | Fok |
| 2006/0258380 A1 | 11/2006 | Liebowitz |
| 2006/0259365 A1 | 11/2006 | Agarwal |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0014282 A1 | 1/2007 | Mitchell |
| 2007/0019614 A1 | 1/2007 | Hoffmann |
| 2007/0021908 A1 | 1/2007 | Jaugilas |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0041513 A1 | 2/2007 | Gende |
| 2007/0049288 A1 | 3/2007 | Lamprecht |
| 2007/0060097 A1 | 3/2007 | Edge |
| 2007/0081635 A1 | 4/2007 | Croak |
| 2007/0115941 A1 | 5/2007 | Patel |
| 2007/0121601 A1 | 5/2007 | Kikinis et al. |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0263610 A1 | 11/2007 | Mitchell |
| 2007/0270164 A1 | 11/2007 | Maier |
| 2007/0293205 A1 | 12/2007 | Henderson |
| 2008/0032703 A1 | 2/2008 | Krumm |
| 2008/0037715 A1 | 2/2008 | Prozeniuk |
| 2008/0063153 A1 | 3/2008 | Krivorot |
| 2008/0065775 A1 | 3/2008 | Polk |
| 2008/0081646 A1 | 4/2008 | Morin et al. |
| 2008/0117859 A1 | 5/2008 | Shahidi |
| 2008/0188198 A1* | 8/2008 | Patel .................. G06F 21/6245 455/404.2 |
| 2008/0192731 A1 | 8/2008 | Dickinson |
| 2008/0214202 A1 | 9/2008 | Toomey |
| 2008/0261636 A1* | 10/2008 | Lau .................... G06F 11/3013 455/466 |
| 2009/0128404 A1 | 5/2009 | Martino |
| 2009/0237210 A1 | 9/2009 | Ciesla |
| 2010/0003954 A1 | 1/2010 | Greene |
| 2010/0021013 A1 | 1/2010 | Gale |
| 2010/0233991 A1* | 9/2010 | Crawford et al. .......... 455/404.1 |
| 2010/0260325 A1* | 10/2010 | Clawson ............... G06F 19/327 379/45 |
| 2010/0262668 A1 | 10/2010 | Piett |
| 2011/0113060 A1 | 5/2011 | Martini |
| 2011/0137549 A1 | 6/2011 | Gupta |
| 2011/0151837 A1 | 6/2011 | Winbush |
| 2011/0207429 A1 | 8/2011 | Maier |

FOREIGN PATENT DOCUMENTS

| | | |
|---|---|---|
| WO | WO99/22546 | 5/1999 |
| WO | WO02/11407 | 7/2001 |
| WO | PCT/US03/028369 | 10/2003 |
| WO | WO2004/098213 | 11/2004 |
| WO | PCT/US2005/022090 | 6/2005 |
| WO | WO2005/051033 | 6/2005 |
| WO | WO2007/025227 | 3/2007 |
| WO | WO2009/105603 | 8/2009 |

OTHER PUBLICATIONS

International Search Report received in PCT/US2012/67689 dated Feb. 22, 2013.

International Search Report received in PCT/US2012/066313 dated Feb. 4, 2013.

International Search Report received in PCT/US2012/067932 dated Feb. 6, 2013.

International Search Report received in PCT/US2011/67689 dated Feb. 22, 2013.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

Nars Haran, U.S. Cellular, Packet Data—Roaming and LBS Overview, Nov. 2, 2007, pp. 1-15.

Andrew Yeow, BCE, LBS Roaming Summit, Sep. 19, 2006, pp. 1-8.

Mike McMullen, Sprint, LBS Roaming Summit, Sep. 19, 2006.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

International Search Report in PCT/US2008/01441dated May 16, 2008.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Yilin Ahao, Efficient and reliable date transmission for cellular and GPS based mayday systems, Nov. 1997, IEEE, IEEE Conference on Intelligent Transportation System, 1997. ITSC 97, 555-559.

European Search Report in Appl. No. EP06827172 dated Dec. 29, 2009.

International Search Report in PCT/US/2010/01938 dated Sep. 30, 2010.

Location Based Services V2 Roaming Support (non proprietary), 80-V8470-2NP A, dated Jan. 27, 2005, pp. 1-56.

Schulzrinne et al., Emergency Services for Internet Telephony Systems draft-schulzrinne-sipping-emergency-arch, IETF Standard Working Draft, Feb. 4, 2004, 1-22.

European Search Report in European appl. No. 06851433.0-2413 dated Aug. 8, 2008.

"Location Services (LCS); Functional Description; stage 2; ETSI TS 101 724," ETSI Standards, Jun. 2004 (2004-2006), XPO14016068, sect. 4, section 5.6.6., fig 3, sect. 7.6.2, fig. 30.

Intrado MSAG Prep for E911 Program and Documentation. Intrado Inc., Longmont, CO. Sep. 14, 2006. Acesses: Nov. 8, 2011. Idaho PSAP Standards Committee. Idaho Emergency Communications Commission, http://idahodispatch.com/index.php?option+com_documan&task+doc_download&gid+3&itemid+7.

International Preliminary Report on Patentability received in PCT/US12/67689 dated Nov. 26, 2013.

* cited by examiner

FIG. 1

| CONTENT QUERY | | TOD: 6:01 PM | |
|---|---|---|---|
| SOURCE: 210 | LOCATION OF SOURCE: | RECIPIENT: | LOCATION OF RECIPIENT: |
| 6097775945 | 38° 53' 23N / 77° 00' 27" W | 7322416600 | 34° 41' 00"N / 65° 22' 41" W |
| | | 7568476655 | 32° 33' 11"N / 71° 25' 66" W |

| MIN: 4445102222 | | 502 | | | 500 |
|---|---|---|---|---|---|
| IDENTIFICATION CREDENTIALS : | | | 532 | | |
| HEALTH PROFILE | 514 | NAME | JANE DOE 516 | AGE | 37 518 534 |
| | | CONDITIONS | ASTHMA DIABETES 522 | MEDICATIONS | INSULIN |
| EMERGENCY CONTACT : | 520 | IDENTIFIER | 6092241111 4425412712512 510 | NAME / RELATION | LYNN / MOM SAM / SISTER 512 |
| POTENTIAL LOCATION SET : | 508 | IDENTIFIER | HOME WORK VACATION HOME | ADDRESS | 1 PARKWAY, CHEVY CHASE MD, 20815 2 MAIN ST. MCLEAN, VA 22181 14 PARADISE IS. SAN DIEGO, CA. 20000, APT.#4 |
| CONTACT LIST : | 504 | (ACCESS PARAMETERS) 524 | | | 530 |
| IDENT 506a | NAME / RELATION | INFO ACCESS 526 | TOD 528 | (LOCATION PARAMETER(S)) ··· | |
| 6095551212 506b | BOB / DAD | LOCATION HEALTH PROF. IDENTIFICATION | 8 AM – 6 PM ANY ANY | WITHIN 5 MI. RADIUS OF SOURCE ANY ANY | |
| 911 | EMERGENCY DISPATCH PERSONNEL | LOCATION IDENTIFICATION | ANY ANY | WITHIN 5 MI. RADIUS OF SOURCE ANY | |

*FIG. 5*

WIRELESS EMERGENCY CALLER PROFILE DATA DELIVERY OVER A LEGACY INTERFACE

The present invention also claims priority from U.S. Provisional Application No. 61/566,918 to Donald Le Roy MITCHELL, Jr., Roger MARSHALL, Andrew SINGER, and Firdaus ARYANA, entitled "Wireless 9-1-1 Caller Profile Data Delivery Over the E2 or Other Legacy ALI Interface" filed Dec. 5, 2011, the entirety of which is expressly incorporated herein by reference.

BACKGROUND OF THE INVENTION

1. Field of the Invention

This invention relates generally to mobile communication devices. More particularly, it relates to wireless communications, including location, messaging, and public safety applications.

2. Background of Related Art

In the current state of technology, a data store (i.e. a data repository) and a signaling method are used in combination to transmit caller information (e.g. a callback number, user name, etc.) from a calling device to a recipient device with a communications event.

A conventional method of complementing a communications event with additional caller information comprises initiating a communications event between a calling device and a recipient device, compiling additional caller information into a signaling message at the calling device, and then routing the signaling message from the calling device to the recipient device with the communications event.

Existing technology and methods do not provide a mechanism for a 911 communicator to retrieve a higher fidelity location description after verbal verification from a caller.

Moreover, there is currently no known deployed method for collecting and disseminating stored profile information to emergency dispatch personnel via the legacy E2 query interface.

SUMMARY OF THE INVENTION

A method and apparatus for dynamically selecting and transmitting stored caller (person, machine, and/or sensor) information to a communications recipient device (e.g. emergency dispatch personnel) with a communications event (e.g. a voice over IP call, an SMS message, an IP message, an MMS message, etc.), comprises a content collection node. In accordance with the principles of the present invention, a content collection node facilitates stored subscriber information to a communications recipient device with a communications event, based on: communication recipient credentials (e.g. IP address, Mobile Directory Number, etc.), subscriber preferences defined for a communications calling device, and other relevant variables, e.g., time of day, location of calling device, location of recipient device, etc. A content collection node dynamically collects customized caller information for a communications recipient device via a subscriber information content collection process.

In accordance with the principles of the present invention, the inventive content collection node is able to dynamically facilitate stored caller information to emergency dispatch personnel (e.g. a public safety answering point) with a 911 communications event, via the legacy E2 query interface. In particular, the inventive content collection node uses relevant variables identified in phase II data conventionally obtained for a 911 calling device, to dynamically select relevant subscriber information from a subscriber profile provisioned for that particular 911 calling device. Relevant subscriber information is inserted in to a data stream delivered to a 911 dispatch agency's customer premises equipment (CPE), and ultimately displayed on that 911 dispatch agency's automatic location identification (ALI) screen.

In accordance with the principles of the present invention, a subscriber provisions personal information associated with users of a subscribing communications device in to a subscriber profile via a secure subscriber information provisioning interface. A subscriber profile is then stored in a subscriber information reference database for use during a communications event. In accordance with the principles of the present invention, a subscriber profile preferably contains identification credentials for users of a corresponding communications device, a contact list, a potential location profile, a health profile, an emergency contact list, and subscriber preferences.

In accordance with the principles of the present invention, subscriber preferences are defined for a communications device to place restrictive conditions on stored subscriber information that may be transmitted with a communications event initiated by that communications device. For instance, a communications device may define subscriber preferences to indicate when (e.g. time of day, day of week, etc.) subscriber information may be transmitted with a communications event initiated by that particular communications device. Moreover, a communications device may define subscriber preferences to indicate specific recipient devices (e.g. emergency dispatch personnel) to which subscriber information may be transmitted with a communications event initiated by that particular communications device.

In accordance with the principles of the present invention, furnishing customized caller information with a communications event (e.g. a 911 call) provides a communications recipient device the ability to attain a higher fidelity location description for a communications source device, and/or a higher fidelity emergency description for a communications source device, following verbal verification from a caller.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

The present invention provides a network element and method for storing subscriber (person, machine, and/or sensor) information for use during a communications event (e.g. a 911 call), based on relevant credentials (e.g. communication recipient credentials and/or communication source credentials) and/or variables, e.g., time of day, day of week, etc. In accordance with the principles of the present invention, a communications event may be, e.g., a voice over IP call, an SMS message, an IP message, an MMS message, etc.

Currently, there is no mechanism to permit a calling device to place restrictive conditions on caller information that may be transmitted with a communications event initiated by that calling device. For instance, a calling device cannot articulate specific times at which certain caller information may be relevant, e.g., in the evening when likely at home; during the weekday when likely at work; etc.

Moreover, there is currently no mechanism to enable a calling device to articulate specific recipient devices to which additional, higher fidelity caller information may be transmitted with a given communications event (e.g., during an emergency call).

As recognized by the current inventors, a calling device may desire that certain caller information be transmitted to certain specific or type recipient devices in a given communications event, and not transmitted to other specific or type recipient devices in that same communications event. For instance, a calling device may desire that a communications system only complement communications events destined to emergency dispatch personnel (e.g. a Public Safety Answering Point) with additional caller information. Moreover, depending on the time of day, a calling device may or may not desire certain caller information to be transmitted to certain recipient devices specified in a communications event.

Consequently, the present inventors have identified a need for a system that references user-defined subscriber preferences to dynamically select and transmit subscriber information pre-provisioned for a calling device, to individual recipient devices specified in a communications event initiated by that calling device.

The present invention facilitates stored caller information to a communications recipient device with a communications event, based on communication recipient credentials (e.g. IP address, Mobile Directory Number, etc.), preferences outlined in a subscriber profile associated with a relevant calling device, and other variables, e.g., time of day, location of calling device, location of recipient device, etc.

In accordance with the principles of the present invention, furnishing customized caller information to a communications recipient device with a communications event (e.g. a 911 call), provides that communications recipient device (e.g. emergency service personnel) the ability to attain a higher fidelity location description for a communications source device, and/or a higher fidelity emergency description for a communications source device, following verbal verification from a caller. Moreover, the present invention enables a communications system to furnish a multiple choice response set (e.g. home address, work address, vacation home address) to a communications recipient device with a communications event, from which the communications recipient device must then select based on information/verbal verification (e.g. "I am at home") provided by a caller.

The present invention permits a subscriber to provision subscriber preferences (i.e. restrictive conditions) and subscriber (person, machine, and/or sensor) information associated with users of a communications device in to a subscriber profile. Subscriber preferences are defined for a communications device to place restrictive conditions on stored subscriber information that may be transmitted to a recipient device with a communications event initiated by that communications device. For instance, subscriber preferences may be defined to identify when (e.g. a time of day, a day of week, etc.) subscriber information may be transmitted with communications events initiated by a particular communications device. Moreover, subscriber preferences may be defined to identify recipient devices (e.g. emergency dispatch personnel) to which caller information may be transmitted with communications events initiated by a particular communications device. In accordance with the principles of the present invention, subscriber preferences are stored in a subscriber information reference database via a secure subscriber information provisioning interface, for use during a communications event.

In accordance with the principles of the present invention, a content collection node references a subscriber profile associated with a calling device to dynamically select and facilitate stored caller information to a communications recipient device with a communications event initiated by that calling device. The content collection node dynamically selects caller information for a communications recipient device based on: communications recipient credentials (e.g. IP address, Mobile Directory Number, etc.), subscriber preferences defined in a subscriber profile for the calling device, and any variables (e.g., time of day, location of recipient device, etc.) relevant to the initiated communications event.

Figure 1:
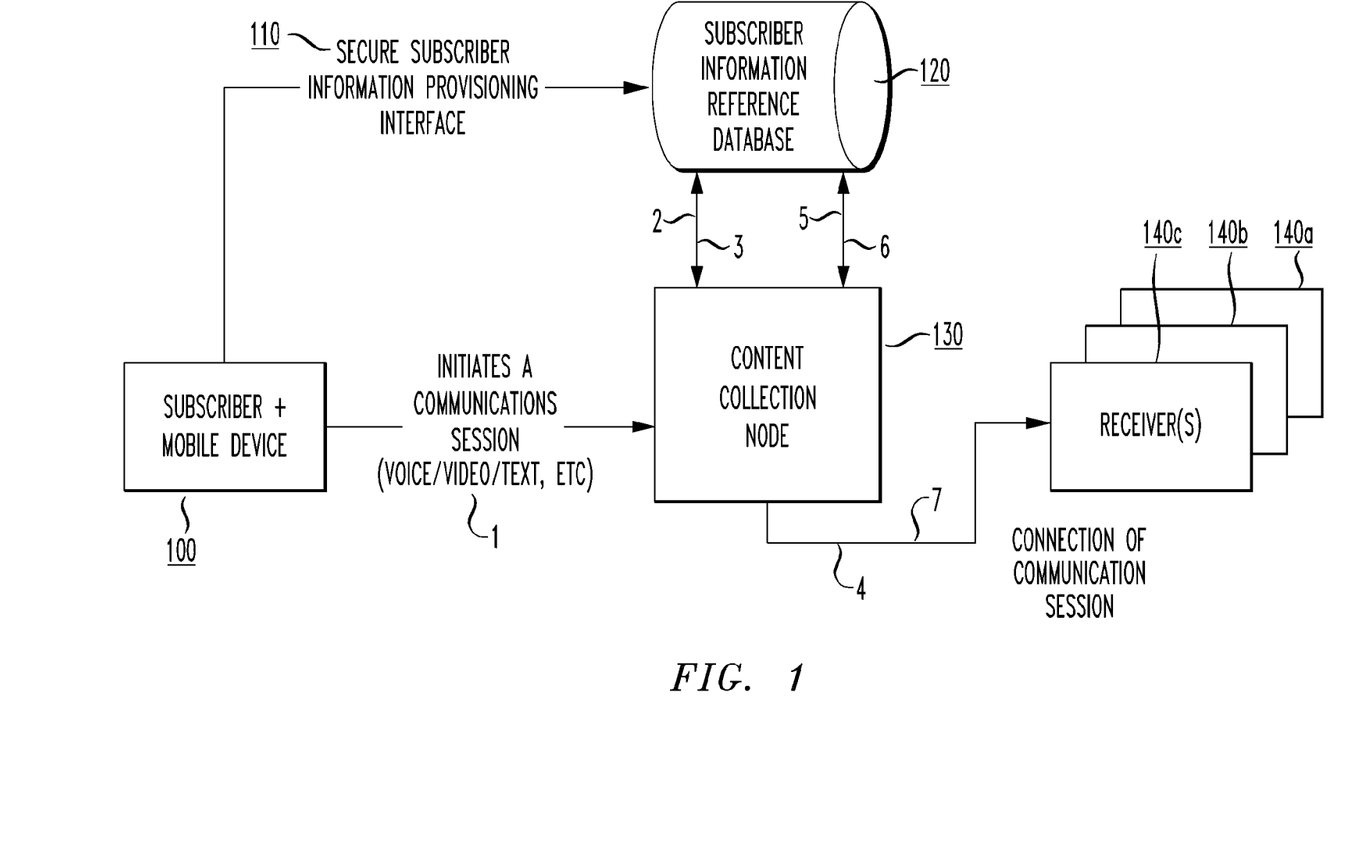
FIG. 1 depicts an exemplary network structure and call flow for dynamically selecting and transmitting caller information associated with a calling device to a communication recipient device with a communications event, in accordance with the principles of the present invention.

FIG. 1 depicts an exemplary network structure for identifying and providing stored caller information to a communications recipient device with a communications event, in accordance with the principles of the present invention.

In particular, a subscriber provisions personal information associated with users of a subscribing communications device 100 in to a subscriber profile via a secure subscriber information provisioning interface 110. A subscriber profile preferably contains identifying data (e.g. name, age, etc.) for users of a corresponding communications device 100, a contact list, a potential location set, a health profile, and user-defined subscriber preferences. Moreover, a subscriber profile may additionally include, e.g., images and/or videos describing information about users of a corresponding communications device 100, additional profiles containing more precise location descriptions for users of a corresponding communications device 100, emergency contact information, etc. A subscriber may access the secure subscriber information provisioning interface 110 to alter/update a subscriber profile at any given time.

In accordance with the principles of the present invention, a subscriber profile provisioned for a communications device 100 is stored in a subscriber information reference database 120 for use during a communications event.

In accordance with the principles of the present invention, subscriber information is dynamically selected for a communications recipient device 140 via a content collection node 130, shown in FIG. 1. In particular, a content collection node 130 initiates a subscriber information content collection process to collect customized caller information for a communications recipient device 140, based on: identification credentials (e.g. IP address, Mobile Directory Number, etc.) corresponding to a particular communications recipient device 140, subscriber preferences articulated in a subscriber profile associated with a communications source device 100, and other relevant variables, e.g., time of day, location of recipient device 140, location of calling device 100, etc. A content collection node 130 only initiates a subscriber information content collection process if one or more recipient devices 140 specified in an initiated communications event is permitted (e.g., by means of a contact list defined in a calling device's 100 subscriber profile) to receive subscriber information pre-provisioned for a relevant calling device 100.

In particular, in accordance with the principles of the present invention, a communications event is first initiated by a subscribing communications device (i.e. a calling device) 100 to one or more communications recipient devices 140, as depicted in step 1 of FIG. 1. The initiated communications event is then forwarded to a content collection node 130 during call routing.

The content collection node 130 receives the communications event initiated in step 1, and retrieves identification credentials for both the calling device (i.e. the subscribing wireless device) 100 specified in the origination field of the communications event, and any recipient devices 140 specified in the destination field. In step 2, the content collection node 130 sends a first query to the subscriber information reference database 120, containing identification credentials specified in the initiated communications event.

The subscriber information reference database 120 receives the first query from the content collection node 130 and uses data contained therein to identify a subscriber profile associated with the communications source device 100. In step 3, the subscriber information reference database 120 sends a first query response to the content collection node 130 to identify which (if any) communications recipient devices (140*a*, 140*b*, and/or 140*c*) are permitted (e.g. by means of a contact list defined in the calling device's 100 subscriber profile) to receive additional caller information with the communications event initiated in step 1.

If no recipient devices 140 are permitted to obtain subscriber information pre-provisioned for the communications source device 100, the content collection node 130 simply forwards the relevant communications event to all communications recipient devices 140 (as depicted in step 4) and call flow is complete.

Alternatively, if any of the one or more recipient devices 140 identified in the communications event are permitted to receive subscriber information pre-provisioned for the communications source device 100, the content collection node 130 initiates a subscriber information content collection process to dynamically collect caller information for appropriate recipient devices (140*a*, 140*b*, and/or 140*c*).

During a subscriber information content collection process, a content collection node 130 collects and compiles various variables, e.g., time of day, day of week, location of calling device 100, location of recipient device 140, location range (a diameter based upon the calling device 100), etc., relevant to the initiated communications event. The content collection node 130 then compiles relevant variables in to a content query and furnishes the content query to the subscriber information reference database 120, as depicted in step 5.

Figure 2:
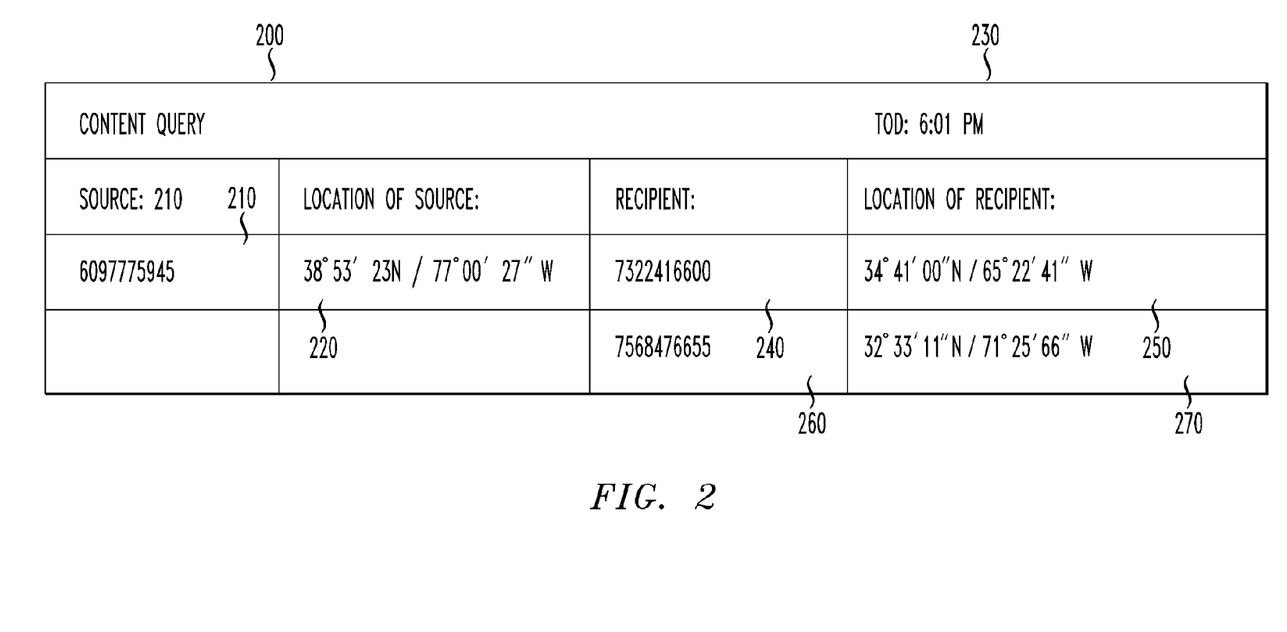
FIG. 2 depicts an illustrative example of a content query, in accordance with the principles of the present invention.

FIG. 2 depicts an illustrative example of a content query, in accordance with the principles of the present invention.

In particular, the content query 200 depicted in FIG. 2 indicates to a subscriber information reference database 120 that a calling device '6097775945' 210, located at lat/lon pair 38°53'23"N/77°00'27"W 220, initiated a communications event at 6:01 PM 230 to a recipient device '7322416600' 240, located at lat/lon pair 34°41'00"N/65°22'41"W 250, and a recipient device '7568476655' 260, located at lat/lon pair 32°33'11"N/71°25'66"W 270.

In step 6 of FIG. 1, the subscriber information reference database 120 receives the content query transmitted in step 5, and uses variables contained therein to return a content query response to the content collection node 130. A content query response contains customized caller information for each communications recipient device (140*a*, 140*b*, and/or 140*c*) permitted to receive caller information pre-provisioned for the communications calling device. Customized caller information is selected based on: communication recipient credentials (e.g. IP address, Mobile Directory Number, etc.), preferences defined in a subscriber profile associated with the calling device 100, and any relevant variables, e.g., time of day, day of week, location of calling device 100, location of recipient device (140*a*, 140*b*, or 140*c*), location range (a diameter based upon the calling device 100), etc., obtained during the subscriber information content collection process.

The content collection node 130 subsequently receives the content query response and uses data contained therein to compose customized caller information messages for each recipient device (140*a*, 140*b*, and/or 140*c*) permitted (e.g. by means of a contact list defined in the calling device's 100 subscriber profile) to receive caller information pre-provisioned for the communications source device 100. Customized caller information messages may be prepared for either automatic or manual retrieval, in accordance with the principles of the present invention.

In step 7, the content collection node 130 forwards the initiated communications event to all recipient devices 140 specified in the communications event destination field, and additionally forwards a customized caller information message to each recipient device (140*a*, 140*b*, and/or 140*c*) permitted (e.g. by means of a contact list defined in the calling device's 100 subscriber profile) to receive caller information therewith.

In accordance with the principles of the present invention, a customized caller information message may be presented automatically to a recipient device 140, or manually following selection by a recipient device 140.

In accordance with the principles of the present invention, the inventive content collection node may also be utilized during conventional 911 call routing procedures to dynamically select and facilitate stored subscriber information to emergency dispatch personnel (e.g. a PSAP) via the legacy E2 query interface (or any other ALI interface that allows insertion of additional text).

In particular, phase II data conventionally collected for a 911 calling device is forwarded to the inventive content collection node during standard 911 call routing procedures. In accordance with the principles of the present invention, the content collection node uses phase II data received thereon, to dynamically select relevant subscriber information from a subscriber profile pre-provisioned for the 911 calling device. Relevant subscriber information collected for the 911 calling device is forwarded to a conventional automatic location identification (ALI) database, whereupon subscriber information is inserted in to a conventional ALI query response and delivered to a 911 dispatch agency's customer premises equipment (CPE), via the legacy E2 query interface (or any other ALI interface that allows insertion of additional text). Relevant subscriber information is ultimately displayed on the requesting 911 dispatch agency's ALI screen.

Figure 3:
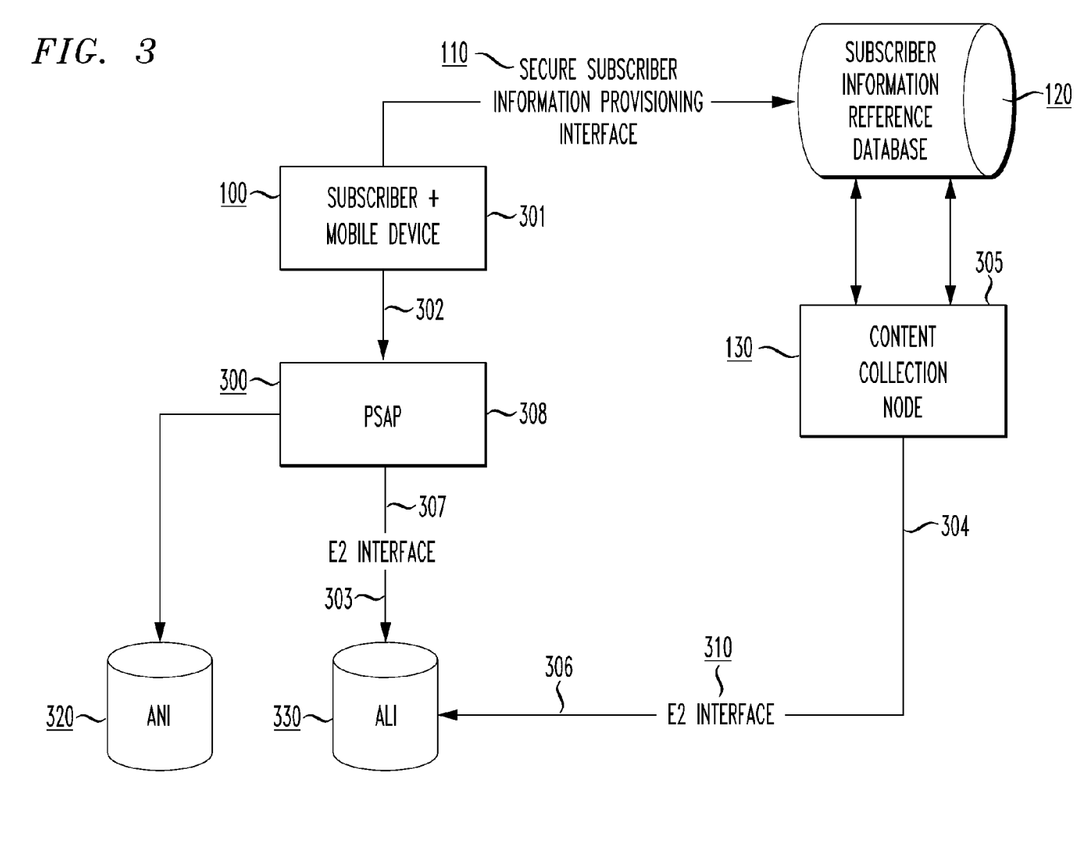
FIG. 3 depicts exemplary transmission of subscriber profile information to a 911 dispatch agency via the E2 query interface, in accordance with the principles of the present invention.

FIG. 3 depicts exemplary transmission of subscriber profile information to a 911 dispatch agency via the legacy E2 query interface, in accordance with the principles of the present invention.

In particular, in accordance with the principles of the present invention, a wireless 911 call is initiated on a subscribing communications device (i.e. a 911 calling device) 100, as depicted in step 301 of FIG. 3. In step 302, the initiated 911 call is routed to an appropriate public safety answering point (PSAP) (i.e. emergency dispatch personnel) 300 via conventional J-STD-036 call routing procedures.

In step 303, the public safety answering point (PSAP) 300 receives the initiated 911 call and requests conventional phase II data (i.e. a callback number and a current geographic location) for the corresponding 911 calling device 100. In particular, the public safety answering point (PSAP) 300 receives a callback number for the 911 calling device 100 via an automatic number identification (ANI) query to a conventional automatic number identification (ANI) database 320. Thereafter, the public safety answering point (PSAP) 300 sends an automatic location identification (ALI) query to a conventional automatic location identification (ALI) database 330, requesting phase II location information for the 911 calling device 100.

In step 304, the ALI database 330 retrieves phase II location information for the 911 calling device 100 via a conventional method of location determination, and then forwards phase II location information to the inventive content collection node 130. In step 305, the content collection node 130 uses phase II data received thereon to dynamically select relevant subscriber information from a subscriber profile pre-provisioned for the 911 calling device 100.

Figure 4:
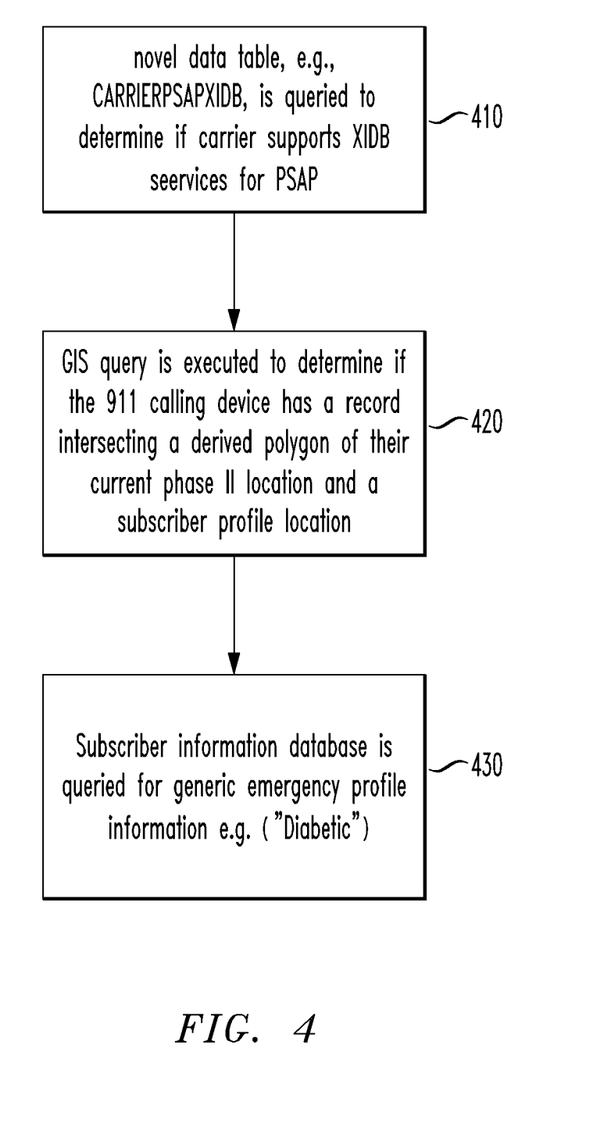
FIG. 4 depicts an exemplary subscriber information content collection process performed by a content collection node for a 911 calling device, in accordance with the principles of the present invention.

FIG. 4 depicts an exemplary subscriber information content collection process performed for a 911 calling device, in accordance with the principles of the present invention.

In particular, as shown in step 410 of FIG. 4, the inventive content collection node 130 first queries a suitable, novel data table, e.g., CARRIERPSAPXIDB, to determine if a carrier is supporting external database (XIDB) services for the requesting public safety answering point (PSAP) 300. The data table, e.g., CARRIERPSAPXIDB, returns, 'Yes', in a query response, to indicate that external database services are supported. The content collection node 130 then initiates a subscriber information content collection process for the 911 calling device 100.

During a subscriber information content collection process, the content collection node 130 performs a geographic information systems (GIS) query to determine if any potential locations defined in the subscriber profile provisioned for the 911 calling device 100, intersect a derived polygon of the phase II location obtained for the 911 calling device 100, as shown in step 420. Any intersecting potential locations stored in the subscriber profile associated with the 911 calling device 100 are returned to the content collection node 130 in a geographic information systems (GIS) query response.

In step 430, the content collection node 130 sends a content collection query to the inventive subscriber information database (i.e. the external database (XIDB)) 120, to request generic emergency information (e.g. identification credentials, a health profile, subscriber medications, an emergency contact list, etc.) stored in the 911 calling device's 100 subscriber profile. Generic emergency information comprises any relevant/emergency information that is both stored in the subscriber information database 120 provisioned for the 911 calling device 100, and authorized (via subscriber preferences) to be furnished to emergency dispatch personnel (e.g. a public safety answering point). In a preferable embodiment, subscriber preferences are bypassed in the event of a 911 emergency. Generic emergency information (e.g. "Diabetic") obtained for the 911 calling device 100 is returned to the content collection node 130 in a content query response.

In step 306 of FIG. 3, the content collection node 130 transmits intersecting potential locations and generic emergency information (e.g. "HEALTH: DIABETIC VERIFY 'ARE YOU AT HOME?' 17703 PEACH BLOSSON DR ATLN") collected for the 911 calling device 100, to the conventional ALI database 330 via the legacy E2 query interface 310.

In step 307, the ALI database 330 places intersecting potential locations and generic emergency data (e.g. "HEALTH: DIABETIC VERIFY 'ARE YOU AT HOME?' 17703 PEACH BLOSSON DR ATLN") retrieved for the 911 calling device in to a location description field (or other suitable field) of a convention ALI query response. The ALI query response is then returned to the requesting public safety answering point (PSAP) 300 via the legacy E2 query interface 310. There are currently ~200+ characters available in a convention E2 location description field.

In step 308 of FIG. 3, the ALI query response containing subscriber profile information dynamically selected for the 911 calling device, is received on the requesting public safety answering point (PSAP) 300, and the legacy ALI query is hereby fulfilled.

Figure 5:
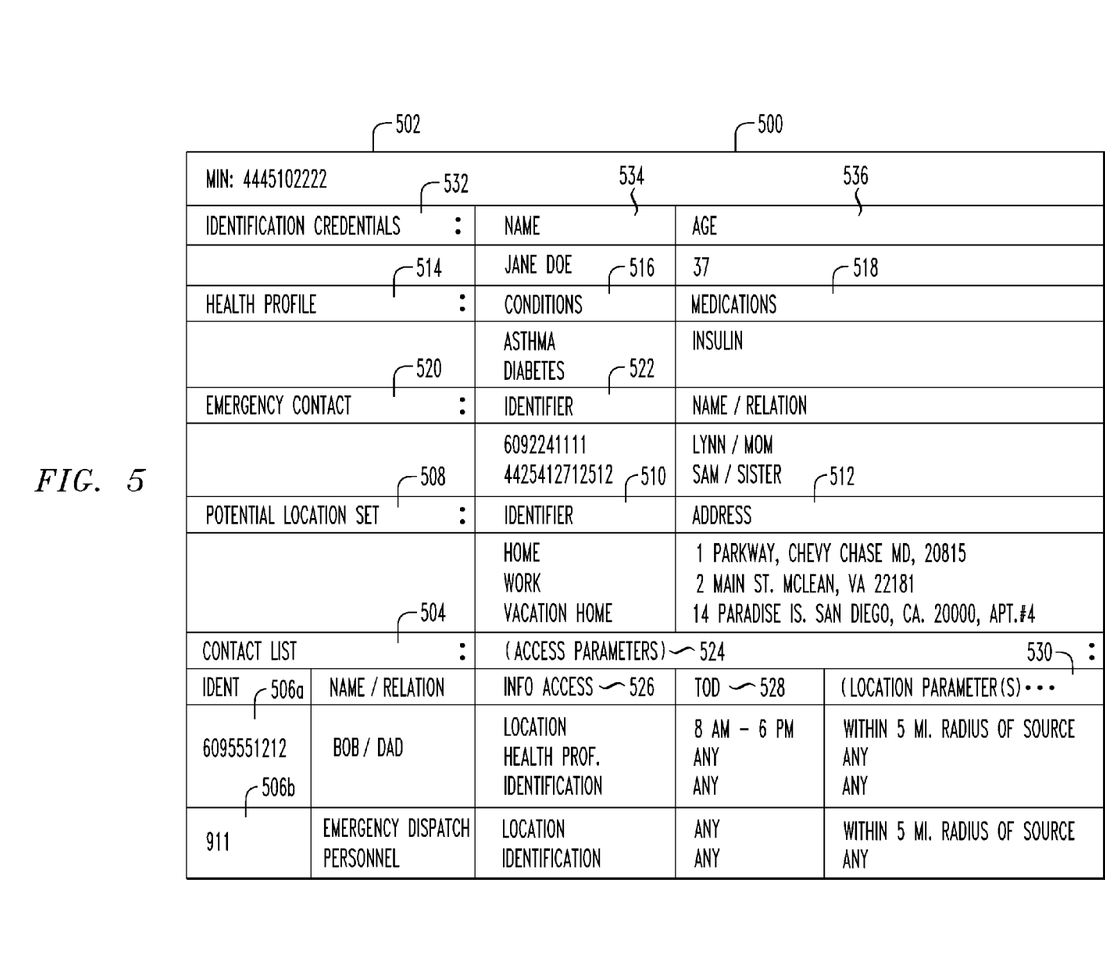
FIG. 5 depicts an illustrative example of a subscriber profile provisioned for a subscribing communication device, in accordance with the principles of the present invention.

FIG. 5 depicts an illustrative example of a subscriber profile provisioned for a subscribing communications device, in accordance with the principles of the present invention.

As depicted in FIG. 3, a subscriber profile 500 preferably contains identification credentials (e.g. name 534, age 536, etc.) 532 for users of a corresponding communications device 502.

In addition, a subscriber profile 500 defined for a subscribing communications device 502 may contain a contact list 504. In accordance with the principles of the present invention, a contact list 504 lists identification credentials (e.g. MIN, MDN, IP address, etc.) 506 for communications recipients to which a subscriber permits pre-provisioned subscriber information to be transmitted with a communications event.

In a preferable embodiment, a contact list 504 may contain emergency service personnel 506b by default. Therefore, subscriber information pre-provisioned for a calling device 502 is always permitted to be transmitted to emergency service personnel (e.g., a Public Safety Answering Point, fire department dispatch personnel, etc.) upon initiation of an emergency communications event (e.g., a 911 call).

Moreover, a subscriber profile 500 may additionally contain a potential location set 508. In accordance with the principles of the present invention, a potential location set 508 includes locations (e.g. an office building, house, vacation home, school, gym, etc.) 510 frequently inhabited by users of a communications device 502. In addition, a potential location set 508 preferably contains a precise address, and any floor number, apartment number, room number, etc 512, relevant to each potential location 510 listed therein.

Further, a subscriber profile 500 may contain a health profile 514. A health profile 514 lists medical conditions 516 and any prescription medicines 518 currently consumed by users of a communications device 502.

Further yet, a subscriber profile 500 may contain an emergency contact list 520. An emergency contact list 520 lists identification credentials 522 for communications recipients that a subscriber wishes to notify upon initiation of an emergency communications event (e.g. a 911 call). In a preferable embodiment, an emergency contact list 520 pre-provisioned for a calling device 502 is automatically furnished to appropriate emergency dispatch personnel with emergency communications events (e.g. a 911 call) initiated by that calling device 502.

Moreover, a subscriber profile 500 preferably contains subscriber preferences 524. Subscriber preferences 524 defined in a subscriber profile 500 place restrictive conditions on stored subscriber information that may be transmitted to a recipient device with a communications event. In particular, a subscriber profile 500 may contain subscriber preferences 524 that permit only certain data 526 defined in a subscriber profile 500 to be furnished to certain communications recipients 506 specified in a communications event. Moreover, subscriber preferences 524 may specify a particular time (e.g. a particular time of day, day of week, etc.) 528 at which a communications system is permitted to furnish certain data defined in a subscriber profile 500 to certain communications recipient devices 506. For instance, a subscriber may define preferences that only permit location information to be furnished to certain recipient devices up to a certain time of day 528 (e.g. a subscriber may not want to share location information with certain communications recipients after 6 pm). Further, a subscriber profile 500 may contain subscriber preferences 524 that only permit location information to be furnished to recipient devices located within a specific geographic area 530 (e.g. a subscriber may only wish to share location information with recipient devices located in a predefined geographic boundary).

The present invention may be extremely valuable to parties (i.e. a calling party and/or a recipient party) engaged in an emergency communications event (e.g. a 911 call).

For instance, the present invention permits a potential location set (i.e. a list of precise potential locations) pre-provisioned for a 911 calling device to be transmitted to emergency dispatch personnel (e.g. a Public Safety Answering Point) with an emergency communications event (e.g. a 911 call). A potential location set received with an emergency communications event permits emergency dispatch personnel to furnish a multiple choice question, e.g., "Are you at home, your vacation house, or work?", to a 911 calling party, regarding a location of a corresponding 911 calling device. A multiple choice question based on a calling party's potential location set may enable emergency dispatch personnel (e.g. a Public Safety Answering Point) to retrieve a higher fidelity location description for a 911 calling device, following verbal verification from a caller. For instance, if a 911 caller answers, e.g. "Yes, I am home.", emergency dispatch personnel may refer to the 911 caller's potential location profile to attain a precise location for the 911 calling device. This ability to retrieve precise location data for a 911 calling device is extremely valuable in the case that a 911 caller is calling, e.g., from a condominium in a large complex, because precise location information defined in a subscriber profile may contain an actual condominium number, floor number, apartment number, etc., that is not obtainable via a latitude/longitude pair conventionally retrieved for a 911 calling device.

For example, when a mobile subscriber places a 911 call via a wireless 911 calling device, that mobile subscriber can reasonably expect location information (e.g. a lat/lon pair) for that 911 calling device to be obtained and routed to emergency dispatch personnel (e.g. a Public Safety Answering Point) with the emergency communications event (i.e. the 911 call). A lat/lon pair obtained for a 911 calling device enables emergency dispatch personnel (e.g. a Public Safety Answering Point) to identify a geographic location for the 911 calling device.

However, if a 911 calling party is located in an apartment building, office building, condominium, etc., a lat/lon pair obtained for a 911 calling device will not enable a 911 call dispatcher to determine a specific floor number, room number, apartment number, etc., in/on which the 911 calling device is located. With the present invention, emergency dispatch personnel may refer to a potential location set received with a 911 communications event, to attain a higher fidelity location description for a 911 calling device, following verbal verification from a caller.

The present invention also permits a health profile pre-provisioned for a 911 calling device to be transmitted to emergency dispatch personnel (e.g. a Public Safety Answering Point) with an emergency communications event (e.g. a 911 call). Emergency dispatch personnel (e.g. a Public Safety Answering Point) may refer to a health profile received with an emergency communications event, to offer a list of options to a 911 calling party regarding a type of assistance that is being requested. More particularly, medical information furnished with a communications event may prompt emergency dispatch personnel (e.g. a Public Safety Answering Point) to furnish a multiple choice question (e.g., "Are you having an asthma attack or experiencing diabetic complications?") to a 911 calling party, to retrieve a higher fidelity emergency description after attaining verbal verification (e.g. "Yes, I am having an asthma attack.") from a caller. Further, in the case that a 911 caller is unable to speak, emergency dispatch personnel (e.g. a Public Safety Answering Point) may say to a caller, e.g., "Press one button on your keypad if you are having an asthma attack or press two buttons on your keypad if you are experiencing diabetic complications". Furnishing a health profile to emergency dispatch personnel with a 911 communications event, permits emergency personnel to arrive at a scene prepared, rather than requiring emergency personnel to assess an emergency situation upon arrival.

The present invention differs from a conventional means of forwarding complementary caller information to a recipient device with a communications event because the present invention provides the ability to determine when caller information is permitted to be transmitted, and what caller information is permitted to be transmitted, based on: communication recipient credentials, subscriber preferences, and any relevant variables, e.g., time of day, location of recipient device, etc.

The present invention may provide a mobile subscriber verified potential location set (e.g. home, office, vacation home) to emergency services and/or commercial entities (e.g., delivery services, marketing services, etc.) with a communications event initiated by that mobile subscriber's mobile device.

The present invention has particular applicability to messaging services, e.g., Short Message Service (SMS), Multimedia Messaging System (MMS), Real-Time Text (RTT), etc. The present invention also has particular applicability to commercial services.

The present invention also has particular applicability to emergency services, and provides a method of providing mobile subscriber information based upon credentials and variables.

While the invention has been describer with reference to the exemplary embodiments thereof, those skilled in the art will be able to make various modifications to the described embodiments of the invention without departing from the true spirit of the invention.

What is claimed is:

1. A method of providing a separate, restricted customized caller information message transmitted during a mobile-originated 911 communications session to an emergency services dispatch device, comprising:

detecting a mobile-originated 911 communications session initiated by a session-initiating mobile device to an emergency services dispatch device;

accessing pre-configured customized caller health profile information relating to a user of said session-initiating mobile device, including a location of said session-initiating mobile device spatially relevant to a phase II location obtained for said session-initiating mobile device;

generating a separate, restricted customized caller health profile information message comprising said caller location information and a sub-set of said pre-configured customized caller health profile information based on at least one pre-configured restrictive parameter associated with said pre-configured customized caller health profile information; and routing said separate, restricted caller health profile information message comprising said caller location information and said sub-set of pre-configured customized caller health profile information to said emergency services dispatch device of said 911 communications session;

whereby a restrictive condition is placed on said pre-configured customized caller health profile information transmitted to said emergency services dispatch device based on said at least one pre-configured restrictive parameter.

2. The method of providing a separate, restricted customized caller information message transmitted during a mobile-originated 911 communications session to an emergency services dispatch device according to claim 1, wherein said 911 communications session comprises:

a voice over Internet protocol (VoIP) call.

3. The method of providing a separate, restricted customized caller information message transmitted during a mobile-originated 911 communications session to an emergency services dispatch device according to claim 1, wherein said 911 communications session comprises:

a two-way text messaging conversation.

4. The method of providing a separate, restricted customized caller information message transmitted during a mobile-originated 911 communications session to an emergency services dispatch device according to claim 1, wherein said 911 communications session comprises:

a short messaging system (SMS) message conversation.

5. The method of providing a separate, restricted customized caller information message transmitted during a mobile-originated 911 communications session to an emergency services dispatch device according to claim 1, wherein said 911 communications session comprises:

a multi-media system (MMS) message conversation.

6. The method of providing a separate, restricted customized caller information message transmitted during a medical communications session to a medical-associated destination device according to claim 1, further comprising:

prompting said user of said medical session-initiating mobile device to respond to a question transmitted to said medical session-initiating mobile device from said medical-associated destination device.

7. A medical conditions content collection network node to provide a separate, restricted customized caller health profile information message to an emergency services dispatch device during a mobile-originated 911 communications session, comprising:

a subscriber health profile information database to maintain pre-configured customized caller health profile information associated with a user of a given 911 communications session-initiating mobile device;

a medical conditions content collection node, in communication with said subscriber health profile information database, to retrieve a pre-configured restrictive parameter to generate a separate, restricted customized caller health profile information message comprising a sub-set of said pre-configured customized caller health profile information based on a match to said restrictive parameter; and a router to route said separate, restricted customized caller health profile information message comprising caller location information and said sub-set of said pre-configured customized caller health profile information to an emergency services dispatch device of said mobile-originated 911 medical communications session;

whereby said medical conditions content collection node restricts transmission of certain customized caller health profile information to said emergency services dispatch device based on a pre-configured parameter.

8. The medical conditions content collection network node to provide a separate, restricted customized caller health profile information message to an emergency services dispatch device during a mobile-originated 911 communications session according to claim 7, wherein said restrictive parameter comprises at least one of:

an Internet Protocol (IP) address; and a Mobile Directory Number (MDN).

9. The medical conditions content collection network node to provide a separate, restricted customized caller health profile information message to an emergency services dispatch device during a mobile-originated 911 communications session according to claim 7, wherein:

said medical conditions content collection node generates said separate, restricted customized caller health profile information message comprising said sub-set of said pre-configured caller health profile information based on a time of day of initiation of said mobile-originated 911 communications session.

10. The medical conditions content collection network node to provide a separate, restricted customized caller health profile information message to an emergency services dispatch device during a mobile-originated 911 communications session according to claim 7, wherein:

said medical conditions content collection node generates said separate, restricted customized caller health profile information message comprising said sub-set of said pre-configured caller health profile information based on a location of said given mobile-originated 911 communications session-initiating mobile device.

11. The medical conditions content collection network node to provide a separate, restricted customized caller health profile information message to an emergency services dispatch device during a mobile-originated 911 communications session according to claim 7, wherein:

said medical conditions content collection node generates said separate, restricted customized caller health profile information message comprising said sub-set of said pre-configured caller health profile information based on a location of said given mobile-originated 911 communications session-initiating mobile device.

12. The medical conditions content collection network node to provide a separate, restricted customized caller health profile information message to an emergency services dispatch device during a mobile-originated 911 communications session according to claim 7, wherein:

said medical conditions content collection node generates said separate, restricted customized caller health profile information message comprising said sub-set of said pre-configured caller health profile information based on a health profile of said user of said mobile-originated 911 communications session-initiating mobile device.

13. The medical conditions content collection network node to provide a separate, restricted customized caller health profile information message to an emergency services dispatch device during a mobile-originated 911 communications session according to claim 7, wherein:

said medical conditions content collection node generates said separate, restricted customized caller health profile information message comprising said sub-set of said pre-configured caller health profile information based on an emergency contact list associated with said mobile-originated 911 communications session-initiating mobile device pre-configured in said subscriber health profile information database.

14. A method of generating a separate, restricted customized caller information message transmitted during a mobile-originated 911 communications session to an emergency services dispatch device, comprising:
   detecting a mobile-originated 911 communications session initiated by a session-initiating mobile device to an emergency services dispatch device via J-STD-036 call routing procedures;
   accessing caller location information spatially relevant to a phase II location obtained for said session-initiating mobile device;
   generating a separate, restricted customized caller information message comprising said caller location information and a sub-set of pre-configured customized caller emergency information based on at least one pre-configured restrictive parameter associated with said pre-configured customized caller emergency information; and
   routing said separate, restricted customized caller information message comprising said caller location information and said sub-set of said pre-configured customized caller emergency information to said emergency services dispatch device;
   whereby a restrictive condition is placed on said sub-set of said pre-configured customized caller emergency information transmitted to a destination device of said mobile-originated 911 communications session.

15. The method of generating a separate, restricted customized caller information message transmitted during a mobile-originated 911 communications session to an emergency services dispatch device according to claim 14, wherein:
   said pre-configured caller location information and said pre-configured customized caller emergency information are routed to said emergency services dispatch device via an E2 query interface.

16. The method of generating a separate, restricted customized caller information message transmitted during a mobile-originated 911 communications session to an emergency services dispatch device according to claim 14, wherein:
   said pre-configured caller location information spatially relevant to a phase II location obtained for said session-initiating mobile device is identified via a geographical information systems query.

* * * * *